US009386214B2

(12) United States Patent
Juhola et al.

(10) Patent No.: US 9,386,214 B2
(45) Date of Patent: Jul. 5, 2016

(54) FOCUSING CONTROL METHOD USING COLOUR CHANNEL ANALYSIS (75) Inventors: Mikko Juhola, Muurla (FI); Markus Vartiainen, Tampere (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 14/372,926

(22) PCT Filed: Jan. 17, 2012

(86) PCT No.: PCT/IB2012/050209
§ 371 (c)(1),
(2), (4) Date: Jul. 17, 2014

(87) PCT Pub. No.: WO2013/108074
PCT Pub. Date: Jul. 25, 2013

(65) Prior Publication Data
US 2015/0009394 A1 Jan. 8, 2015

(51) Int. Cl.
H04N 5/232 (2006.01)
G03B 13/36 (2006.01)

(52) U.S. Cl.
CPC ............ *H04N 5/23212* (2013.01); *G03B 13/36* (2013.01)

(58) Field of Classification Search
CPC ..................... H04N 5/23212; G03B 13/36
See application file for complete search history.

(56) References Cited

U.S. PATENT DOCUMENTS

| | | | |
|---|---|---|---|
| 7,615,729 B2 | 11/2009 | Klein | |
| 2003/0117511 A1 | 6/2003 | Belz et al. | |
| 2003/0184673 A1 | 10/2003 | Skow | |
| 2004/0165090 A1* | 8/2004 | Ning | H04N 5/23212 348/272 |
| 2005/0011956 A1 | 1/2005 | Carlson | |
| 2008/0310830 A1 | 12/2008 | Pan et al. | |
| 2010/0309364 A1 | 12/2010 | Brunner et al. | |
| 2011/0074988 A1 | 3/2011 | Robinson et al. | |
| 2011/0222763 A1 | 9/2011 | Milgrom et al. | |
| 2012/0127360 A1* | 5/2012 | Devaux | G03B 13/36 348/349 |
| 2012/0200726 A1 | 8/2012 | Bugnariu | |

FOREIGN PATENT DOCUMENTS

| | | | | |
|---|---|---|---|---|
| EP | 2 081 391 A2 | | 7/2009 | |
| EP | 2 487 645 A1 | | 8/2012 | |
| FR | WO2011/018575 | * | 2/2011 | ............ G03B 13/36 |
| GB | 2482022 A | | 1/2012 | |
| KR | 10 076 4436 B1 | | 10/2007 | |
| WO | WO 2006/120146 A2 | | 11/2006 | |

OTHER PUBLICATIONS

International Search Report and Written Opinion for Application No. PCT/IB2012/050209 dated Jan. 18, 2013.
Guichard, F. et al., *Extended depth-of-field using sharpness transport across color channels*, Proceedings of the SPIE—International Society for Optical Engineering (Aug. 10, 2008), 13 pages.

* cited by examiner

*Primary Examiner* — Christopher K Peterson
(74) *Attorney, Agent, or Firm* — Alston & Bird LLP (57) ABSTRACT A method, an apparatus and a computer program are provided. The method comprises: analyzing different color channels of an image detected by an image sensor; and adjusting, in dependence upon the analysis, at least one of: a position of a focal plane of an optical arrangement and a position of the image sensor. In some embodiments, the sharpness of different color channels of the image is compared and the adjustment depends upon the results of the comparison.

20 Claims, 7 Drawing Sheets

FOCUSING CONTROL METHOD USING COLOUR CHANNEL ANALYSIS

TECHNOLOGICAL FIELD

Embodiments of the present invention relate to focusing. In particular, they relate to controlling focusing based on analyzing different color channels of an image.

BACKGROUND

Some digital cameras employ an "auto focus" where, in viewfinder mode and/or video capturing mode, the camera automatically performs adjustments in order to focus on a particular area or subject. If a digital camera has a "continuous auto focus", the camera continuously re-adjusts the focusing over time. This may be done, for example, to keep a moving subject in focus.

It can be difficult for the camera to determine how to perform correct auto focusing. In circumstances where there is a moving subject, it can be difficult for the camera to determine how to keep the moving subject in focus.

BRIEF SUMMARY

According to various, but not necessarily all, embodiments of the invention there is provided a method, comprising: analyzing different color channels of an image detected by an image sensor; and adjusting, in dependence upon the analysis, at least one of: a position of a focal plane of an optical arrangement and a position of the image sensor.

According to various, but not necessarily all, embodiments of the invention there is provided an apparatus, comprising: at least one processor; and at least one memory storing a computer program comprising computer program instructions configured, when performed by the at least one processor, to cause at least the following to be performed: analyzing different color channels of an image detected by an image sensor; and adjusting, in dependence upon the analysis, at least one of: a position of a focal plane of an optical arrangement and a position of the image sensor.

According to various, but not necessarily all, embodiments of the invention there is provided a non-transitory computer readable medium storing a computer program comprising computer program instructions that, when performed by at least one processor, cause at least the following to be performed: analyzing different color channels of an image detected by an image sensor; and adjusting, in dependence upon the analysis, at least one of: a position of a focal plane of an optical arrangement and a position of the image sensor.

According to various, but not necessarily all, embodiments of the invention there is provided an apparatus, comprising: means for analyzing different color channels of an image detected by an image sensor; and means for adjusting, in dependence upon the analysis, at least one of: a position of a focal plane of an optical arrangement and a position of the image sensor.

According to various, but not necessarily all, embodiments of the invention there is provided a method, comprising: comparing different color channels of an image, detected by an image sensor, to determine whether there is at least a given difference in sharpness between the different color channels; in response to determining that there is at least a given difference in sharpness between the different color channels, adjusting at least one of: a position of a focal plane of an optical arrangement and a position of the image sensor; and in response to failing to determine that there is at least a given difference in sharpness between the different color channels, refraining from adjusting a position of the focal plane of the optical arrangement and a position of the image sensor.

According to various, but not necessarily all, embodiments of the invention there is provided an apparatus, comprising: at least one memory storing a computer program comprising computer program instructions configured, when performed by the at least one processor, to cause at least the following to be performed: comparing different color channels of an image, detected by an image sensor, to determine whether there is at least a given difference in sharpness between the different color channels; in response to determining that there is at least a given difference in sharpness between the different color channels, adjusting at least one of: a position of a focal plane of an optical arrangement and a position of the image sensor; and in response to failing to determine that there is at least a given difference in sharpness between the different color channels, refraining from adjusting a position of the focal plane of the optical arrangement and a position of the image sensor.

BRIEF DESCRIPTION

For a better understanding of various examples of embodiments of the present invention reference will now be made by way of example only to the accompanying drawings in which.

DETAILED DESCRIPTION

Embodiments of the invention relate to using the properties of dispersive refraction to determine when and how to adjust at least one of: the position of a focal plane F of an optical arrangement and the position of an image sensor, in order to improve focusing.

In this regard, the appended figures illustrate an apparatus 10/20, comprising: at least one processor 12; and at least one memory 14 storing a computer program 16 comprising computer program instructions 18 configured, when performed by the at least one processor, to cause at least the following to be performed: analyzing different color channels of an image detected by an image sensor 22; and adjusting, in dependence upon the analysis, at least one of: a position of a focal plane F of an optical arrangement 26 and a position of the image sensor 22.

Figure 1:
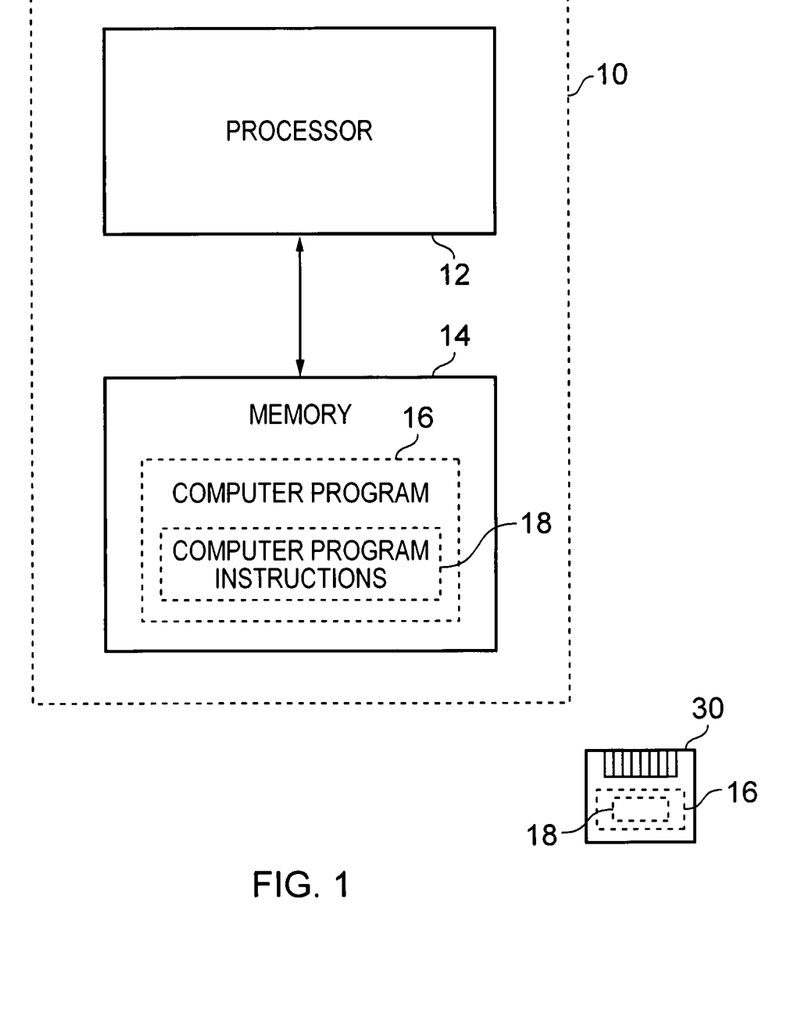
FIG. 1 illustrates an apparatus such as a chipset.

FIG. 1 illustrates a schematic of an apparatus 10 comprising at least one processor 12 and at least one memory 14. The apparatus 10 may, for example, be a chip or a chipset. Although a single processor 12 and a single memory 14 are illustrated in FIG. 1, in some implementations of the invention more than one processor 12 and/or more than one memory 14 is provided.

The processor 12 is configured to read from and write to the memory 14. The processor 12 may also comprise an output interface via which data and/or commands are output by the processor 12 and an input interface via which data and/or commands are input to the processor 12.

Although the memory 14 is illustrated as a single component it may be implemented as one or more separate components some or all of which may be integrated/removable and/or may provide permanent/semi-permanent/dynamic/cached storage.

The memory 14 stores computer program instructions 18 that control the operation of the apparatus 10 when loaded into the processor 12. The computer program instructions 18 provide the logic and routines that enables the apparatus 10/20 to perform the methods illustrated in FIGS. 4 and 6. The processor 12, by reading the memory 14, is able to load and execute the computer program instructions 18.

The computer program instructions 18 may arrive at the apparatus 10/20 via any suitable delivery mechanism 30. The delivery mechanism 30 may be, for example, a non-transitory computer-readable storage medium, a computer program product, a memory device, a record medium such as a compact disc read-only memory (CD-ROM) or digital versatile disc (DVD), and/or an article of manufacture that tangibly embodies the computer program instructions 18. The delivery mechanism 30 may be a signal configured to reliably transfer the computer program instructions 18. The apparatus 10/20 may propagate or transmit the computer program instructions 18 as a computer data signal.

Figure 2:
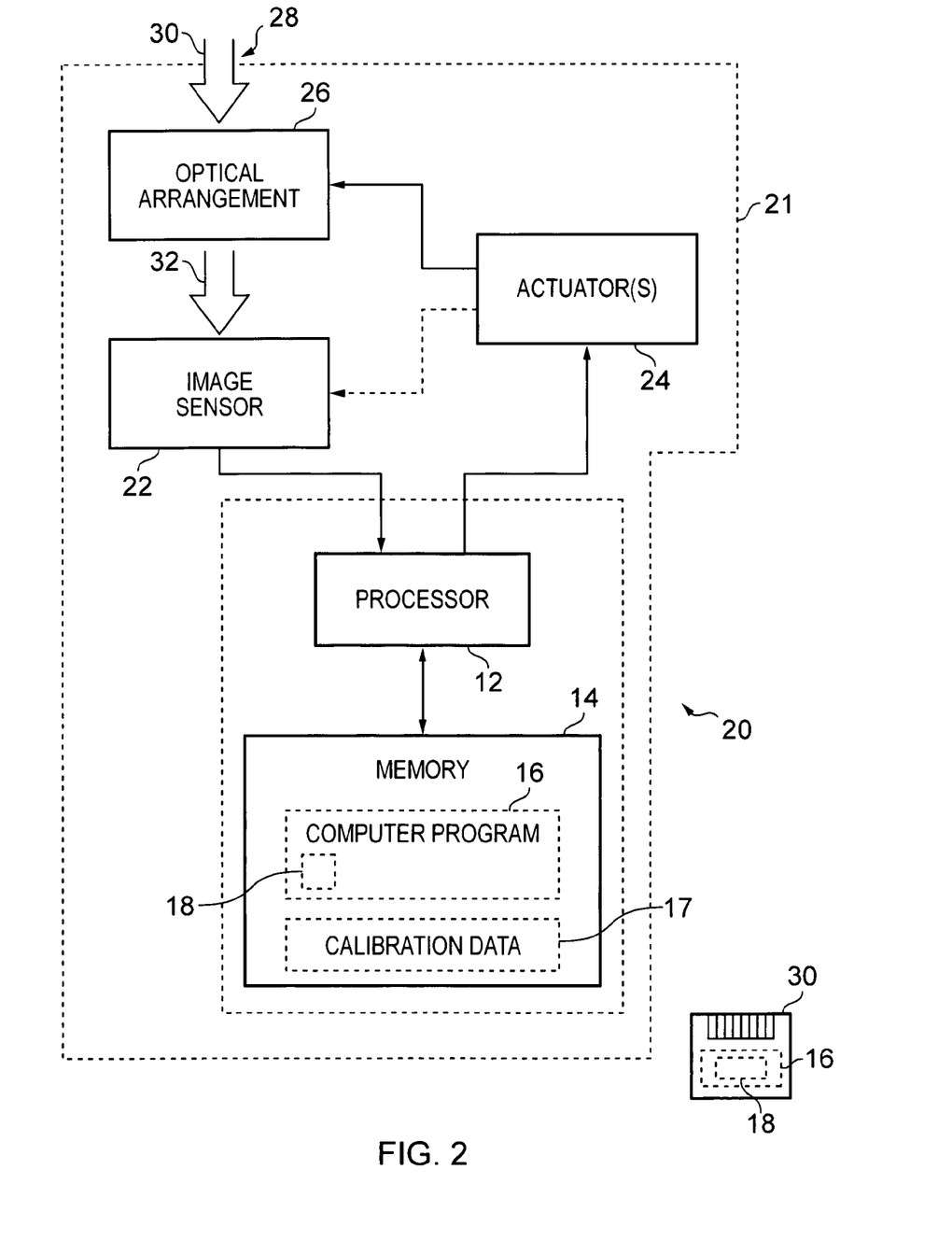
FIG. 2 illustrates an apparatus such as a camera.

FIG. 2 illustrates a schematic of a further apparatus 20. The apparatus 20 may, for example, be a camera. In some embodiments of the invention, the apparatus 20 may be hand portable and may have further functionality. For example, the apparatus 20 may be configured to operate as a mobile telephone, a tablet computer, a games console and/or a portable music player.

The apparatus 20 illustrated in FIG. 2 comprises an image sensor 22, one or more actuators 24, an optical arrangement 26 and the apparatus 10 illustrated in FIG. 1. The elements 12, 14, 22, 24 and 26 are operationally coupled and any number or combination of intervening elements can exist (including no intervening elements). The elements 12, 14 and 22, 24 and 26 may be co-located within a housing 21.

The image sensor 22 may, for example, be a charge coupled device (CCD), a complementary metal-oxide-semiconductor (CMOS) sensor or any other type of image sensor. It is configured to convert incident light (that is, an incident optical image) into an electronic signal. The processor 12 is configured to read electronic signals from the image sensor 22 and store them as image data in the memory 14.

The image sensor 22 comprises a plurality of sets of pixels for detecting different colors. For example, in some embodiments, the image sensor 22 comprises sets of pixels for detecting red, green and blue. Each set of pixels of the image sensor 22 can be considered to correspond with a "color channel".

The optical arrangement 26 is configured to convey light onto the image sensor 22. It may comprise one or more optical devices such as one or more lenses and/or one or more reflectors. FIG. 2 schematically illustrates light entering the housing 21 of the apparatus 20 via an aperture 28, and subsequently being directed towards the image sensor 22 by the optical arrangement 26. The arrow labeled with the reference number 30 in FIG. 2 represents light entering the aperture 28. The arrow labeled with the reference number 32 illustrates light that is directed towards the image sensor 22 by the optical arrangement 26.

The processor 12 may be configured to adjust a focal plane F of the optical arrangement 26. In the illustrated embodiment, the one or more actuators 24 are configured to move at least a portion of the optical arrangement 26 via a mechanical coupling to the optical arrangement 26. The processor 12 is configured to adjust a focal plane F of the optical arrangement 26 using the actuator(s) 24. In some embodiments of the invention the processor 12 may, for example, control the actuator(s) 24 via drive circuitry.

In some embodiments of the invention, the processor 12 is configured to adjust a position of the image sensor 22. For example, the processor 12 may control the one or more actuators 24 to move the image sensor 22. This may be in addition to or as an alternative to moving at least a portion of the optical arrangement 26.

Figure 3A:
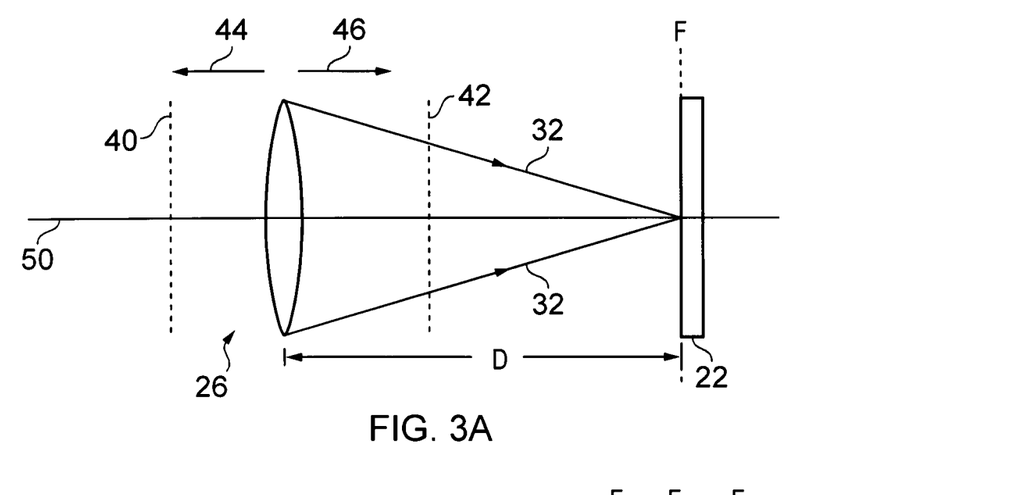
FIG. 3A illustrates an optical arrangement focusing an optical image onto an image sensor.

FIG. 3A illustrates a schematic of the optical arrangement 26 conveying an optical image onto the image sensor 22. For simplicity, the optical arrangement 26 in this example is illustrated as being a single lens. It will, however, be appreciated that the optical arrangement 26 may take other forms.

For clarity reasons, the light being conveyed onto the image sensor 22 by the optical arrangement 26 is represented by (only) two rays 32 that meet the image sensor 22 at the optical axis 50 of the lens/optical arrangement 26.

In the example illustrated in FIG. 3A, the distance D between the lens/optical arrangement 26 and the image sensor 22 is equal to the focal distance of the lens/optical arrangement 26. That is, the focal plane F of the lens/optical arrangement 26 is positioned at the surface of the image sensor 22.

As explained above, the processor 12 is configured to adjust a position of a focal plane F of the optical arrangement 22 and/or a position of the image sensor 22. In this particular example, the processor 12 is configured to adjust the distance D between the lens/optical arrangement 26 and the image sensor 22 by moving the illustrated lens/optical arrangement 26 towards a macro position 40 (as indicated by the arrow 44) or by moving the lens/optical arrangement 26 towards an infinity position 42 (as indicated by the arrow 46). As those skilled in the art will know, the lens/optical arrangement 26 is positioned in the macro position 40 when a subject is close to the lens/optical arrangement 26. The lens/optical arrangement 26 is positioned in the infinity position 42 when a subject is far away from the lens/optical arrangement 26.

Every lens exhibits dispersive refraction to some degree. In dispersive refraction, different colors of light are refracted by a lens to different extents. This means that the focal distance of a lens for blue light is shorter than the focal length of the lens for green light. The focal distance of a lens for green light is shorter than the focal distance of the lens for red light.

Figure 3B:
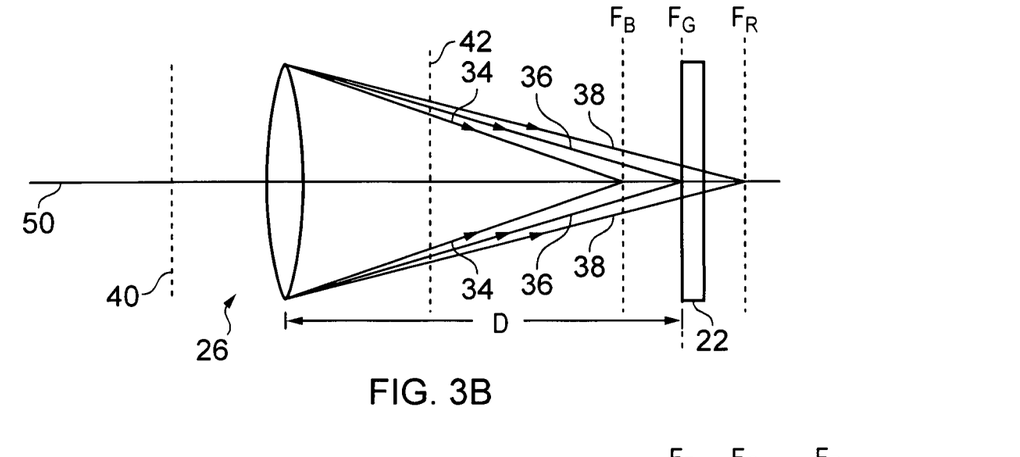
FIGS. 3B and 3C illustrate an optical arrangement focusing an optical image onto an image sensor, where dispersive refraction is present.

FIG. 3B illustrates a situation where a subject is being imaged and blue 34, green 36 and red 38 light is being refracted by the lens 26. In the illustrated example, the distance D between the lens 26 and the image sensor 22 corresponds with the focal distance of the lens for green light 36, but does not correspond with the focal distance of the lens for blue light 34 or red light 38. That is, the surface of the image sensor 22 is positioned such that it is at the focal plane $F_G$ of the optical arrangement 26 for green light 36, but not at the focal planes $F_B$, $F_R$ of the optical arrangement 26 for blue and red light 34, 38. This means green colored aspects of the subject will be in focus in the captured image, but the blue and red colored aspects of the subject in the image will not be fully in focus and will exhibit more blurriness.

Figure 3C:
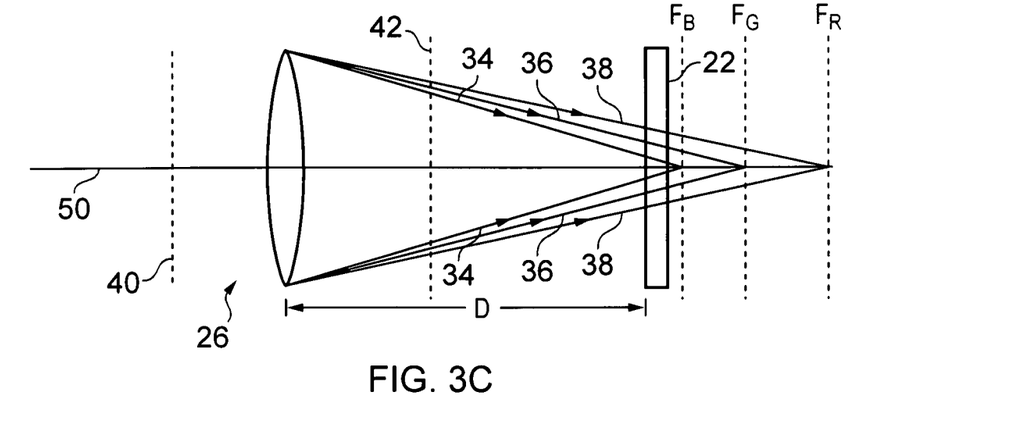

FIG. 3C illustrates a different example to that illustrated in FIG. 3C, where the focal plane $F_B$ for blue light 34 is closer to the position of the image sensor 22 than the focal planes $F_G$, $F_R$ for green light 36 and red light 38. In this example, blue colored aspects of the subject being imaged will be sharper than red and green colored aspects.

When attempting to focus an image onto an image sensor 22, in many circumstances it is considered to be desirable for the position of the image sensor 22 to coincide with the focal plane $F_G$ for green light. This is because (at least for multi-colored images) it represents the best compromise, since green colored objects in the image are sharp and red and blue colored objects images only exhibit a small amount of blurriness when a lens of a reasonable quality is used.

An example of a method according to embodiments of the invention will now be described with reference to FIGS. 3B, 3C, 3D and 4. Initially, a user of the apparatus 20 decides that he wishes to capture an image or a video and places the apparatus into a "viewfinder mode". The user directs the aperture 28 of the apparatus 20 towards a subject that he wishes to capture in a still image. FIG. 3B illustrates blue 34, green 36 and red 38 light being conveyed from the subject to the image sensor 22 by the lens 26. The subject is currently considered to be in focus, because the focal plane $F_G$ for green light 36 coincides with the position of the image sensor 22.

However, in this example, before the still image is captured the subject moves closer to the apparatus 20. FIG. 3C illustrates blue 34, green 36 and red 38 light being conveyed from the subject to the image sensor 22, by the lens 26, following movement of the subject.

The blue 34, green 36 and red 36 light is detected by the blue, green and red pixels of the image sensor 22 respectively. It is converted into an electronic signal by the image sensor 22, which in turn, is converted into image data by the processor 12. The information detected by the blue, green and red pixels can be considered to be different color channels in the image data.

Figure 4:
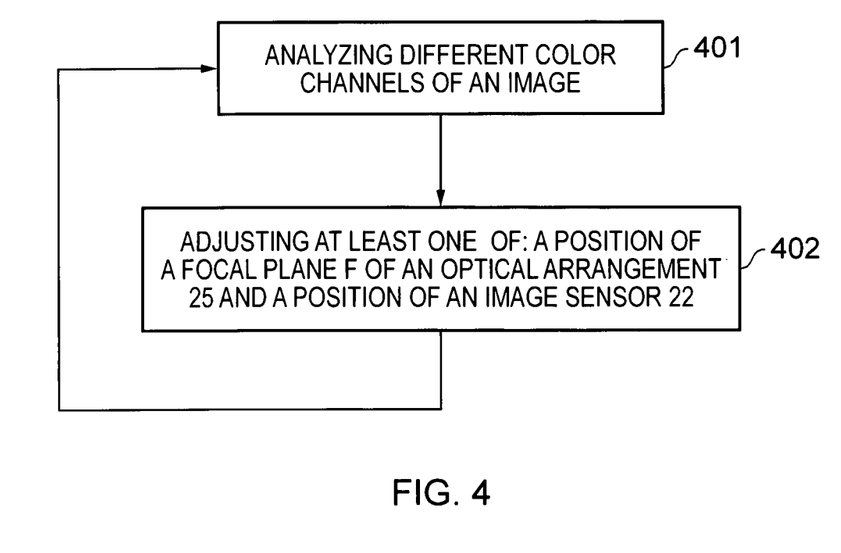
FIG. 4 is a flowchart of a first method.

At block 401 of FIG. 4, the processor 12 analyzes the different color channels in the image data. In some embodiments, the analysis comprises the processor 12 comparing a property of a color channel with an equivalent property of at least one other color channel. For example, the processor 12 may compare a property of the red color channel with equivalent properties of the blue and green color channels. Similarly, the processor 12 may compare a property of the green color channel with equivalent properties of the blue and red color channels, and compare a property of the blue color channel with equivalent properties of the red and green color channels.

In this example, the property that is compared is the sharpness of the color channels. In order to compare the sharpness of the color channels with one another, the processor 12 may, for instance, generate a modulation transfer function (MTF) to make the comparison.

In some implementations, calibration data 17 stored in the memory 14 (see FIG. 2) may be used to analyze the image data and make the comparison. For instance, in these implementations, the sensitivity of the pixels of the image sensor 22 may be measured during production. The calibration data 17 may be determined from the measured sensitivity of the pixels and subsequently used post-production for scaling purposes when determining (and comparing) the sharpness of the color channels.

The computer program instructions 18 may comprise a sharpness determining algorithm. The sharpness determining algorithm may cause the processor 12 to use a filter mask to compare adjacent pixels with one another in order to detect contrast in a particular color channel, or to compare a set of pixels with an adjacent set of pixels in order to detect contrast in a particular color channel. A focus/sharpness value may be calculated from each comparison. The sharpness values may be summed to determine a cumulative/total sharpness value for a color channel as a whole.

In this example, since the focal plane $F_B$ for blue light 34 is closer to the position of the image sensor 22 than the focal planes $F_G$, $F_R$ for green and red light 36, 38 (see FIG. 3C), the processor 12 determines from the analysis of the image performed in block 401 of FIG. 4 that the blue color channel is sharper than both the green and red color channels.

The result of the analysis in performed in block 401 in FIG. 4 indicates whether a position of a focal plane $F_B$, $F_G$, $F_R$ and/or the position of the image sensor 22 should be adjusted to improve the focus of the optical image being conveyed into the image sensor 22. It also indicates which direction the focal plane $F_B$, $F_G$, $F_R$ should be moved in (and/or the direction in which the image sensor 22 should be moved), in order to improve the focus.

In this example, where the blue color channel is sharper than both the green and the red channels, the processor 12 concludes that the distance D between at least a portion of the optical arrangement 26 (in this case, the illustrated lens 26) and the image sensor 22 should be increased, in order to align the focal plane $F_G$ for green light 36 with the position of the image sensor 22. In some embodiments, there must be at least a given difference in sharpness for the processor 12 to determine that the distance D should be increased.

At block 402 of FIG. 4, the processor 12 adjusts the distance between the lens/optical arrangement 26 and the image sensor 22 by moving the lens 26 away from the image sensor 22 and towards the macro position 40. In embodiments where the image sensor 22 is movable, the processor 12 may increase the distance by moving the image sensor 22 away from the lens/optical arrangement 26.

Figure 3D:
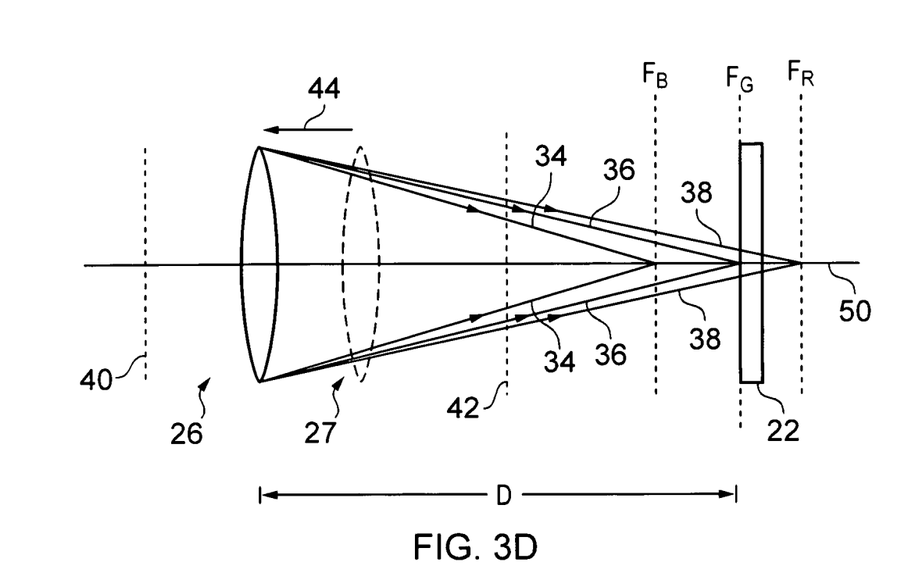
FIG. 3D illustrates the optical arrangement in FIG. 3C being moved relative to the image sensor.

FIG. 3D illustrates the lens 26 after it has moved towards the macro position 40, in the direction indicated by the arrow 44. The dotted line 27 indicates the position from which the lens 26 has moved.

The lens 26 is moved to a position where the focal plane $F_G$ for green light 36 coincides with the position of the image sensor 22, improving the overall sharpness of the optical image formed on the image sensor 22.

The method illustrated in FIG. 4 may be repeated in order to maintain correct focus. For example, in embodiments where the apparatus 20 has a continuous auto focus (for instance, in viewfinder mode) further images are obtained the position of the focal plane $F_G$ and/or the position of the image sensor 22 may be continually adjusted using the further images by continually repeating the method illustrated in FIG. 4.

Figure 5:
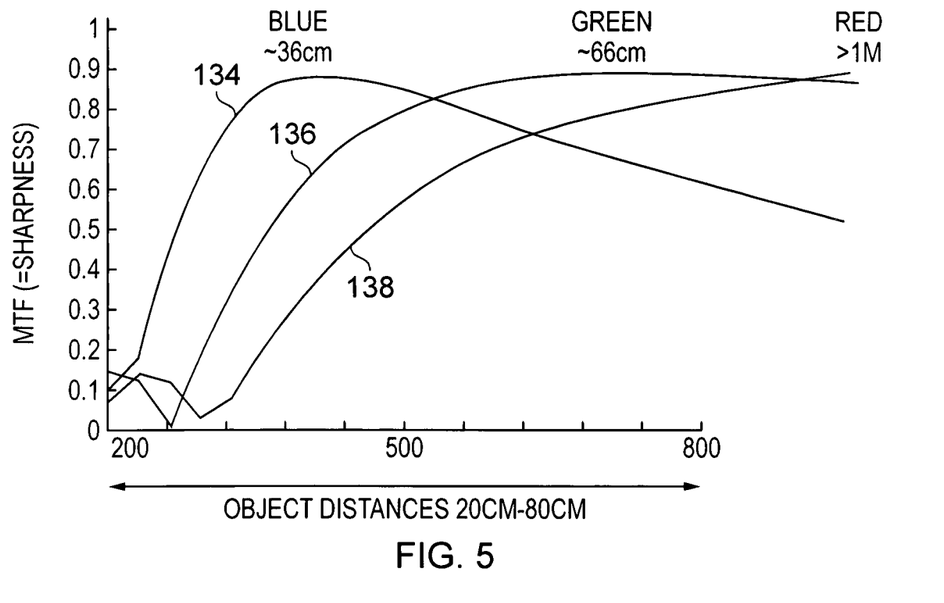
FIG. 5 is a graph of sharpness versus distance in a situation where the distance between an apparatus and a subject is approximately 60 centimeters.

FIG. 5 is a graph illustrating a modulation transfer function (representing sharpness) versus the distance from the apparatus 20 to an object/subject, where the position of the focal plane $F_G$ for green light is positioned at the image sensor 22 for an apparatus to subject distance of around 60 cm. It can be from FIG. 5 that the sharpness in the blue color channel, represented by the line 134, peaks at around 34 cm. The sharpness in the green color channel is represented by the line 136 and peaks at around 66 cm. The sharpness in the red color channel is represented by the line 138 and peaks at over 1 meter.

If a subject is moving while an image is being formed on the image sensor 22, it may be that none of the color channels exhibits a particularly higher sharpness than the others, because the image is generally blurry. In some embodiments of the invention, the processor 12 may be configured to identify this and, in the event that all of the color channels are blurry, refrain from adjusting the position of the focal plane $F_G$ and/or the position of the image sensor 22. A method according to these embodiments of the invention is illustrated in FIG. 6.

Figure 6:
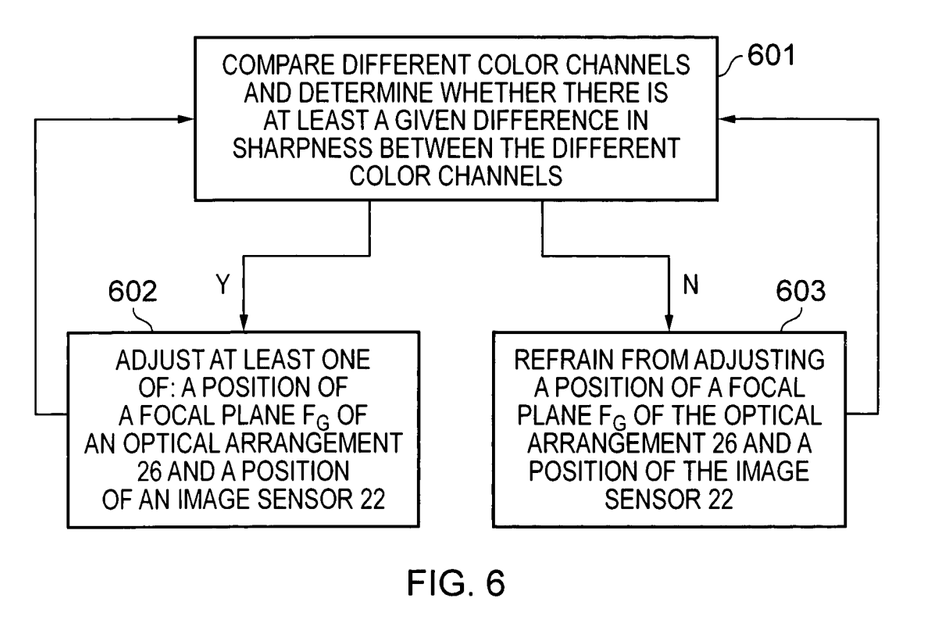
FIG. 6 is a flowchart of a second method.

At block 601 in FIG. 6, the processor 12 compares different color channels of an image, detected by the image sensor 22, to determine whether there is at least a given difference in sharpness between the different color channels. For example, in some embodiments, the processor 12 may determine a difference in sharpness between the color channels exceeds a threshold. In other embodiments, the processor 12 may merely determine whether not there is any difference in sharpness.

If the processor 12 determines that there is at least a given difference in sharpness between the different color channels, the flow chart proceeds to block 602. In block 602, the processor 12 adjusts a position of a focal plane $F_G$ and/or the position of the image sensor 22 as explained above in relation to FIG. 4.

If the processor 12 fails to determine that there is at least a given difference in sharpness between the different color channels, the flow chart proceeds to block 603. In block 603, the processor 12 refrains from adjusting the position of the focal plane $F_G$ and the position of the image sensor 22.

The method illustrated in FIG. 6 may be repeated in order to determine, at various instances over a period of time, whether or not to adjust at least one of the position of the focal plane $F_G$ and the image sensor 22 to try to maintain correct focus.

In some embodiments of the invention, the processor 12 determines whether there is a color channel imbalance in the image before performing the analysis/comparison in blocks 401 and 601 in FIGS. 4 and 6. There is considered to be a color channel imbalance if the image includes significantly more data for one color channel than the others. For instance, a photograph of green vegetation might include far more data in the green color channel than the red and blue color channels.

The processor 12 may determine whether there is a color channel imbalance by analyzing the image and generating a color histogram. If processor 12 determines that the color channel imbalance is below a threshold, the total focus/sharpness value for one or more color channels is adjusted (for example, scaled) to account for the imbalance. If the processor 12 determines that the color channel imbalance is above the threshold, the processor 12 may refrain from performing the analysis in blocks 401 and 601 of FIGS. 4 and 6 in respect of one or more color channels, because a reliable result cannot be obtained.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The blocks illustrated in FIG. 4 and/or 6 may represent steps in a method and/or sections of code in the computer program 16. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For example, embodiments of the invention are described above in relation to an apparatus 20 in viewfinder mode. Alternatively or additionally, the methods described in relation FIGS. 4 and 6 be may be used while the apparatus 20 is in a video mode (capturing video), in order to maintain an optical image in focus at the image sensor while the video is being captured.

In the embodiments of the invention described above, one or more actuators 24 are used to move at least a portion of the optical arrangement 26, in order to adjust a position of a focal plane of the optical arrangement 26. In some other embodiments of the invention, the manner in which the processor 12 changes a position of a focal plane of the optical arrangement 26 may be different from that described above. For example, in some embodiments, the optical arrangement 26 may be or comprise one or more electro-optical lenses (that are, for instance, liquid crystal based) and the processor 12 may adjust a focal plane of the electro-optical lenses by controlling a variable electromagnetic field.

The example of the method described above in relation FIG. 4 involves movement of a subject while focusing. However, it will be clearly apparent to those skilled in the art that the embodiments of the invention may also be used to control focusing in situations where there is no movement of the subject.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method, comprising:
   determining whether data in each of a plurality of different color channels in an image, detected by an image sensor, is indicative of a color channel imbalance in the image;
   calculating a plurality of values indicative of image sharpness in each of the plurality of color channels by analyzing data in each of the plurality of different color channels of the image;
   adjusting at least one of the calculated plurality of values based on a determined color channel imbalance, if a color channel imbalance in the image was determined; and
   causing, in dependence upon the analysis, adjustment of at least one of: a position of a focal plane of an optical arrangement and a position of the image sensor.

2. A method as claimed in claim 1, wherein analyzing data in each of the plurality of different color channels comprises comparing a property of a color channel with an equivalent property of at least one other color channel.

3. A method as claimed in claim 2, where the property is the sharpness of the color channel and the equivalent property is the sharpness of the at least one other color channel.

4. A method as claimed in claim 3, wherein the adjustment is made in response to determining, from the comparison, that the color channel is sharper than the at least one other color channel.

5. A method as claimed in claim 1, wherein the adjustment is made by adjusting a position of at least a portion of the optical arrangement and/or adjusting a position of the image sensor.

6. A method as claimed in claim 1, wherein adjusting at least one of: the position of the focal plane of the optical arrangement and the position of the image sensor comprises moving at least a portion of the optical arrangement and/or the image sensor, and the direction or directions of movement are dependent upon the analysis.

7. A method as claimed in claim 1, wherein the analysis of data in each of the plurality of different color channels is dependent upon calibration data.

8. A method as claimed in claim 1, further comprising: subsequently analyzing data in each of the plurality of different color channels of a further image detected by the image sensor; and in response to the subsequent analysis, refraining from further adjusting the position of the focal plane of the optical arrangement and the position of the image sensor.

9. An apparatus, comprising:
   at least one processor; and
   at least one memory storing a computer program comprising computer program instructions configured, when performed by the at least one processor, to cause at least the following to be performed:
   determining whether data in each of a plurality of different color channels in an image, detected by an image sensor, is indicative of a color channel imbalance in the image;
   calculating a plurality of values indicative of image sharpness in each of the plurality of color channels by analyzing data in each of the plurality of different color channels of the image;
   adjusting at least one of the calculated plurality of values based on a determined color channel imbalance, if a color channel imbalance in the image was determined; and
   causing, in dependence upon the analysis, adjustment of at least one of: a position of a focal plane of an optical arrangement and a position of the image sensor.

10. An apparatus as claimed in claim 9, wherein analyzing data in each of the plurality of the different color channels comprises comparing a property of a color channel with an equivalent property of at least one other color channel.

11. An apparatus as claimed in claim 10, where the property is the sharpness of the color channel and the equivalent property is the sharpness of the at least one other color channel.

12. An apparatus as claimed in claim 11, wherein the adjustment is made in response to determining, from the comparison, that the color channel is sharper than the at least one other color channel.

13. An apparatus as claimed in claim 9, wherein adjusting at least one of:
   the position of the focal plane of the optical arrangement and the position of the image sensor comprises moving at least a portion of the optical arrangement and/or the image sensor, and the direction or directions of movement are dependent upon the analysis.

14. An apparatus as claimed in claim 9, wherein the computer program instructions are further configured to cause at least the following to be performed: subsequently analyzing data in each of the plurality of different color channels of a further image detected by the image sensor; and in response to the subsequent analysis, refraining from adjusting the focal plane of the optical arrangement and the position of the image sensor.

15. An apparatus as claimed in claim 14, wherein analyzing data in each of the plurality of different color channels of the further image comprises comparing the sharpness of a color channel with the sharpness of at least one other color channel, and, after failing to determine at least a given difference in sharpness from the comparison, neither the focal plane of the optical arrangement nor the position of the image sensor is adjusted.

16. An apparatus as claimed in claim 15, wherein failing to determine at least a given difference in sharpness results from the further image being detected while one or more subjects of the further image are moving.

17. An apparatus as claimed in claim 9, wherein the apparatus is a camera comprising the optical arrangement and the image sensor.

18. The apparatus of claim 9, wherein a color channel imbalance is determined to exist if there is significantly more data for one color channel in the image than for other color channels in the image.

19. The apparatus of claim 9, wherein at least one of the calculated plurality of values is adjusted based on a determined color channel imbalance if the color channel imbalance exists and is below a particular threshold; and if the color channel imbalance is above the particular threshold, the plurality of values is not calculated.

20. A non-transitory computer readable medium storing a computer program comprising computer program instructions that, when performed by at least one processor, cause at least the following to be performed:
   determining whether data in each of a plurality of different color channels in an image, detected by an image sensor, is indicative of a color channel imbalance in the image;
   calculating a plurality of values indicative of image sharpness in each of the plurality of color channels by analyzing data in each of the plurality of different color channels of an image;

adjusting at least one of the calculated plurality of values based on a determined color channel imbalance, if a color channel imbalance in the image was determined; and causing, in dependence upon the analysis, adjustment of at least one of: a position of a focal plane of an optical arrangement and a position of the image sensor.

* * * * *